March 9, 1965 R. V. BURNS ETAL 3,172,959

TELEPHONE AMPLIFIER

Filed Nov. 28, 1961

INVENTORS.
ROBERT V. BURNS
RUSSELL C. FISCHER

BY C. A. Gullbrandsen

ATTY.

United States Patent Office 3,172,959
Patented Mar. 9, 1965

3,172,959
TELEPHONE AMPLIFIER

Robert V. Burns, Markham, and Russell C. Fischer, Chicago, Ill., assignors to Automatic Electric Laboratories, Inc., Northlake, Ill., a corporation of Delaware Filed Nov. 28, 1961, Ser. No. 155,433
16 Claims. (Cl. 179—81)

This invention is related to telephone amplifiers and more particularly to an improved amplifier for use in a loudspeaking telephone.

In the past loudspeaking telephones have included two amplifier circuits in their design. Since amplifying circuits inherently conduct one way only, it became necessary to separate transmitting and receiving circuits from each other. A separate amplifier was then provided for each. Frequently special techniques must be employed to prevent interaction of transmit and receive amplifiers in loudspeaking telephone circuits. Obviously the cost of loudspeaking telephone equipment is affected by the fact that two amplifier circuits must be included in each loudspeaking telephone station.

Accordingly it is an object of the present invention to provide a new and useful loudspeaking telephone circuit that utilizes a single amplifier.

A first feature of the present invention is the inclusion of an amplifier circuit that operates in both the transmitting and receiving modes.

Another feature of the present invention is the reduction of components in a loudspeaking telephone circuit by elimination of one amplifier circuit.

Another feature of the present invention is the elimination of operating mode switching means.

Yet another feature of the present invention is the inclusion of amplifier circuitry that performs as a push-pull and a parallel amplifier at the same time.

Figure 1:
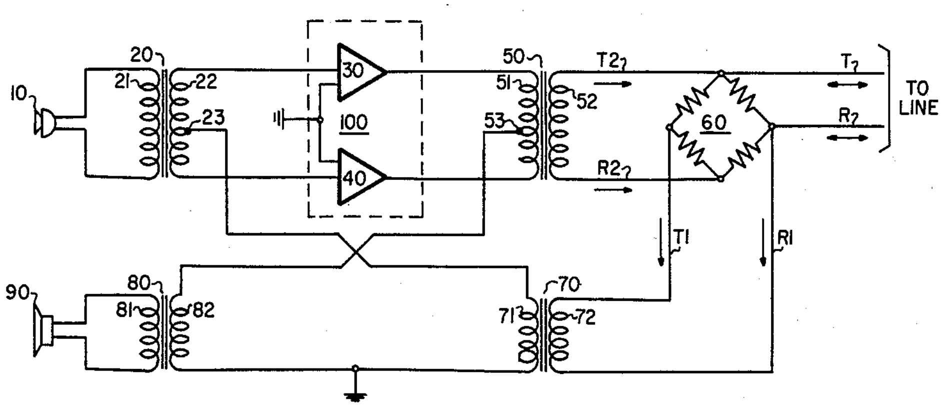
FIG. 1 is a schematic diagram of a loudspeaking telephone station embodying an amplifier arrangement according to the present invention.

The components of the present invention shown in FIG. 1 including a microphone 10, a coupling transformer 20 including primary winding 21, secondary winding 22 and secondary winding center tap 23, an amplifier 100 including amplifying devices 30 and 40, a coupling transformer 50 which includes primary winding 51, secondary winding 52 and primary winding center tap 53, a hybrid circuit 60, a coupling transformer 70 including primary winding 72 and secondary winding 71, coupling transformer 80 including primary winding 82 and secondary winding 81 and loudspeaker 90. Also included are conductors T and R which are connected to a telephone line leading either to a telephone central office or to a telephone private exchange, conductors T1 and R1 which conduct incoming signals from the hybrid circuit to the amplifier circuitry and conductors T2 and R2 which connect the outgoing signals from the amplifier circuitry to the hybrid circuit. The amplifying devices 30 and 40 may be vacuum tubes, transistors or any device of similar capabilities.

Also included, as in conventional loudspeaking telephones would be signal receiving means such as a telephone ringer bridged across the line, a signalling device such as a dial and some form of switching means for connecting and disconnecting the loudspeaker telephone circuit from the line. All of these components are well known in the art and have no related function to the amplifier circuitry of the instant invention. Consequently these items have been eliminated from FIGS. 1 and 2 as being unnecessary to the present invention.

For a further understanding of the operation of an amplifier circuit according to the present invention a description of the operation of the present invention as shown in FIG. 1 will be given first with reference to incoming signals received over the telephone line and second a description of the handling of outgoing signals from the loudspeaking telephone to the telephone line.

Incoming signals from the telephone central office or private exchange are received from the line over conductors T and R, coupled to the hybrid circuit 60, which may be of any well-known form of hybrid circuit, further extended over conductors T1 and R1 to the primary winding 72 of coupling transformer 70. These signals are induced in the secondary winding 71 of transformer 70 and conducted further to the primary winding 82 of coupling transformer 80 at its lower terminal over the common (ground) path, and to the center tap 23 of secondary winding 22 of coupling transformer 20. The incoming signal is then transmitted on a parallel basis through the upper and lower halves of secondary winding 22 to amplifying devices 30 and 40 respectively. These two devices amplify the incoming signal on a parallel basis. The amplified signal is applied simultaneously to the upper and lower terminals of primary winding 51 of transformer 50. The resultant signal which is additive in nature is obtained at the center tap 53 of primary winding 51 and conducted from there to the primary winding 82 of coupling transformer 20 completing the circuit path from the line to the primary winding of coupling transformer 80. Thus the incoming signal which has now been amplified is reproduced by the loudspeaker 90.

When the incoming signal is flowing through the two halves of secondary winding 22 of coupling transformer 20 it should be noticed that the signal is flowing in each half of the secondary winding in opposite directions at the same time thus effectively canceling any induction of this signal into the primary winding 21 of transformer 20. The same situation exists in the primary winding 51 of transformer 50. The signals flowing in the upper and lower halves of the primary winding 51 effectively cancel each other so that the incoming signal is not induced into the secondary winding 52 of coupling transformer 50.

Outgoing voice signals are extended to the telephone line and subsequently to the telephone central office or private exchange in the following manner. The subscriber speaks into the microphone 10. The voice signals are converted into electrical energy by the microphone 10 and conducted to the primary winding 21 of coupling transformer 20. This signal is then induced in the secondary winding 22 of coupling transformer 20 and extended alternately to the two amplifying devices 30 and 40 respectively in a manner conventionally known as push-pull. When the alternating voice currents are applied to these amplifying devices the entire signal is coupled in its amplified form to the primary winding 51 of transformer 50. This signal is inductively coupled to the secondary winding 52 and thence over conductors T2 and R2 to the hybrid circuit 60 where in turn it is coupled to the telephone line via conductors T and R. No portion of the outgoing signal is connected to the incoming signal circuitry since the outgoing voice signals are applied to the terminals of primary winding 21 of transformer 20 in a push-pull manner, and as such are 180° out of phase when passing the mid point of the transformer primary. These signals are coupled to the secondary winding in the same phase relationship, resulting in zero output at center tap 23. Similarly, the push-pull signals coupled from the amplifying devices 30 and 40 to the terminals of primary winding 51 of transformer 50 are 180° out of phase at center tap 53 and produce no output signal at this point.

From the above description it is discernible that the amplifying devices 30 and 40 simultaneously function as a push-pull amplifier for outgoing signals to the telephone line and as a parallel amplifier for incoming signals from the telephone line. The coupling technique utilized in the present invention separates the incoming and outgoing signals so they do not interact.

Figure 2:
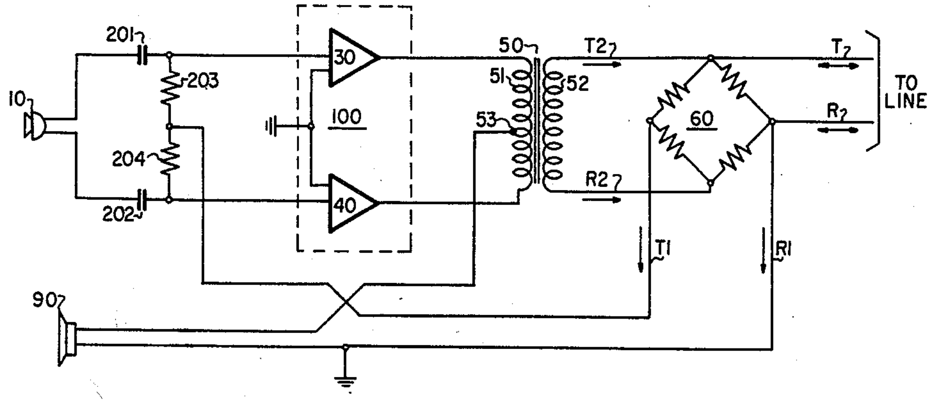
FIG. 2 is a schematic diagram of a loudspeaking telephone station embodying another amplifier arrangement according to the present invention.

The operation of the amplifier according to FIG. 2 is similar to that of the amplifier of FIG. 1 except that resistance-capacitance coupling by means of capacitors 201 and 202 and resistances 203 and 204 is employed for coupling outgoing signals from microphone 10 to the inputs of amplifying devices 30 and 40. Likewise incoming signals being received over the telephone line are applied to the junction point of resistances 203 and 204 and from there extended in phase to the input terminals of the amplifier.

It will be obvious to those skilled in the art that changes and modifications may be made without departing from this invention in its broadest aspects and therefore the aim in the appended claims is to cover all such changes and modifications as in the true spirit and scope of this invention.

What is claimed is:

1. In combination, a first communication channel for the transmission of signals in one direction, a second communication channel for the transmission of signals in another direction, two amplifying means common to said first and second channels, and circuit means for including said amplifying means in said first channel in parallel relationship to each other and in said second channel in push-pull relationship to each other.

2. In combination a communication line for the transmission of signals in both directions, a first branch channel for the transmission of signals in one direction, a second branch channel for the transmission of signals in the other direction, a hybrid circuit interconnecting said communication line with said first and second channels, two amplifying means common to said first and second channels, and circuit means for including said amplifying means in said first channel in parallel relationship and in said second channel in push-pull relationship.

3. A telephone signal repeater connected to a telephone line and including: signal transmitting and receiving means; coupling means connected to said signal means; a hybrid circuit connected to said telephone line, to said signal means and to said coupling means; a transformer including a center tapped primary winding, and a secondary winding connected to said hybrid circuit; said signal means further including a circuit connection to said center tap; and an amplifier circuit including a first and second amplifying device each having an input circuit connected to said coupling means and an output circuit connected to said transformer primary winding.

4. A telephone signal repeater as claimed in claim 3 wherein: said coupling means comprise a transformer.

5. A telephone signal repeater as claimed in claim 3 wherein: said coupling means comprise a resistive-capacitive network.

6. A telephone signal repeater connected to a telephone line including: signal transmitting and receiving means; a first transformer having a primary winding connected to said signal means, and a center tapped secondary winding; a hybrid circuit connected to said telephone line, to said signal means, and to the center tap on said secondary winding; a second transformer including a center tapped primary winding, and a secondary winding connected to said hybrid circuit; said signal means further including a circuit connected to said center tap on said primary winding; and an amplifier circuit including a first and second amplifying device each having an input circuit connected to said first transformer secondary winding and an output circuit connected to said second transformer primary winding.

7. A telephone signal repeater connected to a telephone line including: signal transmitting and receiving means; a first transformer having a primary winding connected to said signal means, and a center tapped secondary winding; a hybrid circuit connected to said telephone line, to said signal means, and to said center tap on said secondary winding; a second transformer including a center tapped primary winding, and a secondary winding connected to said hybrid circuit; said signal means further including a circuit connection to said primary winding center tap; and an amplifier circuit including a first amplifying device having an input circuit connected to the first end of said first transformer secondary winding and an output circuit connected to a first end of said second transformer primary winding and a second amplifying device having an input terminal connected to a second end of said first transformer secondary winding and an output terminal connected to a second end of said second transformer primary winding.

8. A loud speaking telephone connected to a telephone line including: a microphone; coupling means connected to said microphone; a hybrid circuit connected to said telephone line, and to said coupling means; a transformer including a center tapped primary winding, and a secondary winding connected to said hybrid circuit; a loudspeaker connected to said center tap on said primary winding, and to said hybrid circuit; and an amplifier circuit including a first and a second amplifying device each having an input circuit connected to said coupling means, and an output circuit connected to said transformer primary winding respectively.

9. A loudspeaking telephone as claimed in claim 8 wherein: said coupling means comprise a transformer.

10. A loudspeaking telephone as claimed in claim 8 wherein: said coupling means comprise a resistive-capacitive network.

11. A loudspeaking telephone connected to a telephone line including: a microphone; a first transformer including a primary winding connected to said microphone, and a center tapped secondary winding, a hybrid circuit connected to said telephone line, and to said secondary winding center tap; a second transformer including a center tapped primary winding, and a secondary winding connected to said hybrid circuit; a loudspeaker including a circuit connection to said primary winding center tap, and a circuit connection to said hybrid circuit; an amplifier circuit having a first and a second amplifying device each having an input circuit connected to said first transformer secondary winding and an output circuit connected to said second transformer primary winding respectively.

12. A loudspeaking telephone connected to a telephone line and including: a microphone; a hybrid circuit connected to said telephone line; a transformer including a center tapped primary winding, and a secondary winding connected to said hybrid circuit; a loudspeaker including a circuit connection to said primary winding center tap, and to said hybrid circuit; an amplifier circuit including a first amplifying device having an input terminal coupled through a first capacitor to said microphone and an output terminal connected to said transformer primary winding and a second amplifying device having an input terminal coupled through a second capacitor to said microphone, and an output terminal connected to said transformer primary winding; and a circuit connection from said hybrid circuit to said first and said second amplifying device input terminals.

13. A loudspeaking telephone connected to a telephone line and including: a microphone; a first transformer including a primary winding connected to said microphone, and a center tapped secondary winding; a hybrid circuit connected to said telephone line, and to said secondary winding center tap; a second transformer including a center tapped primary winding, and a secondary winding connected to said hybrid circuit; a loudspeaker including a circuit connection to said secondary winding center tap, and a circuit connection to said hybrid; and an amplifier circuit including a first amplifying device having an input circuit connected to a first end of said first transformer secondary winding and an output circuit connected to a first end of said second transformer primary winding, and a second amplifying device having an input terminal connected to a second end of said first transformer secondary winding and an output terminal connected to a second end of said second transformer primary winding.

14. A loudspeaking telephone connected to a telephone line and including: a microphone; a hybrid circuit connected to said telephone line; a transformer including a center tapped primary winding, and a secondary winding connected to said hybrid circuit; a loudspeaker including a circuit connection to said primary winding center tap, and a circuit connection to said hybrid; an amplifier circuit including a first amplifying device having an input circuit capacitively coupled to said microphone and an output circuit connected to a first end of said transformer primary winding and a second amplifying device having an input circuit capacitively coupled to said microphone and an output circuit connected to a second end of said transformer primary winding; and a circuit connection from said hybrid circuit to the input terminals of said first and said second amplifying devices.

15. A loudspeaking telephone connected to a telephone line including: a microphone; a first transformer including a primary winding connected to said microphone, and a center tapped secondary winding; a hybrid circuit including an incoming signal path connected to said secondary winding center tap, an outgoing signal path, and a two way signal path connected to said telephone line; a second transformer including a center tapped primary winding, and a secondary winding connected to said hybrid circuit outgoing signal path; a loudspeaker including a circuit connection to said primary winding center tap, and a circuit connection to said hybrid circuit incoming signal path; and an amplifier circuit including a first amplifying device having an input circuit connected to a first end of said first transformer secondary winding and an output circuit connected to a first end of said second transformer primary winding and a second amplifying device having an input terminal connected to a second end of said first transformer secondary winding and an output terminal connected to a second end of said second transformer primary winding.

16. A loudspeaking telephone connected to a telephone line and including: a microphone; a hybrid circuit including an incoming signal path, an outgoing signal path, and a two way signal path connected to said telephone line; a transformer including a center tapped primary winding, and a secondary winding connected to said hybrid circuit outgoing signal path; a loudspeaker including a circuit connection to said primary winding center tap and to said hybrid circuit incomng signal path; an amplifier circuit including a first amplifying device having an input circuit capacitively coupled to said microphone and an output circuit connected to a first end of said transformer primary winding and a second amplifying device having an input terminal capacitively coupled to said microphone and an output terminal connected to a second end of said transformer primary winding; and a circuit connection from said input signal path of said hybrid circuit to the input terminals of said first and said second amplifying devices.

References Cited by the Examiner

UNITED STATES PATENTS

| | | | |
|---|---|---|---|
| 2,369,144 | 2/47 | Herrick | 179—81 |
| 3,022,379 | 2/62 | Soderbaum et al. | 179—1 |

ROBERT H. ROSE, *Primary Examiner.*

WILLIAM C. COOPER, *Examiner.*